(12) United States Patent
Lee et al.

(10) Patent No.: US 9,477,944 B2
(45) Date of Patent: Oct. 25, 2016

(54) ASYNCHRONOUS SERIALIZATION FOR AGGREGATING PROCESS RESULTS

(75) Inventors: Jason C. Lee, Union City, CA (US); Terri A. Menendez, Richmond, MA (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 13/460,625

(22) Filed: Apr. 30, 2012

(65) Prior Publication Data

US 2013/0290271 A1 Oct. 31, 2013

(51) Int. Cl.
*G06Q 10/10* (2012.01)
*G06Q 30/02* (2012.01)
*G06F 17/30* (2006.01)

(52) U.S. Cl.
CPC .............. *G06Q 10/10* (2013.01); *G06Q 30/02* (2013.01); *G06F 17/30165* (2013.01); *G06F 17/30312* (2013.01)

(58) Field of Classification Search
CPC .................................. G06F 17/30312
USPC .................................. 707/692, 696
See application file for complete search history.

(56) References Cited

U.S. PATENT DOCUMENTS

| | | | |
|---|---|---|---|
| 6,154,847 A * | 11/2000 | Schofield et al. | 714/4.4 |
| 6,393,432 B1 | 5/2002 | Flansburg et al. | |
| 7,340,510 B1 * | 3/2008 | Liskov et al. | 709/220 |
| 7,356,493 B2 * | 4/2008 | Choi et al. | 705/27.1 |
| 8,140,495 B2 * | 3/2012 | Carlin et al. | 707/696 |
| 8,676,720 B1 * | 3/2014 | Neal et al. | 705/343 |
| 2002/0023070 A1 * | 2/2002 | Branch | G06F 17/30008 |
| 2002/0111956 A1 * | 8/2002 | Yeo et al. | 707/200 |
| 2003/0233366 A1 * | 12/2003 | Kesselman et al. | 707/100 |
| 2004/0139108 A1 | 7/2004 | Tang et al. | |
| 2004/0148232 A1 | 7/2004 | Fushimi et al. | |
| 2007/0233581 A1 * | 10/2007 | Peter | 705/27 |
| 2007/0282882 A1 | 12/2007 | Agarwal et al. | |
| 2008/0222604 A1 * | 9/2008 | Murphy | 717/120 |

(Continued)

FOREIGN PATENT DOCUMENTS

| | | |
|---|---|---|
| EP | 1 102 188 A2 | 5/2001 |
| EP | 1 168 200 A2 | 1/2002 |
| EP | 1 553 492 A2 | 7/2005 |

OTHER PUBLICATIONS

N. Rizzuto, How to implement Enhanced Catalog Sharing, Aug. 28, 2010.*
Plow and Shields, ICF Catalog Sharing Protocol at Record Key Granularity, IBM Technical Disclosure Bulletin, Sep. 1, 1992.*
"Implementing Synthetic Aggregate Search and Comparison Terms for Catalogs of Information," IP.com Prior Art Database, IPCOM000205551D, Mar. 30, 2011, 4 pages.

(Continued)

*Primary Examiner* — Brittany N Allen
(74) *Attorney, Agent, or Firm* — Zilka-Kotab, PC

(57) ABSTRACT

In one embodiment, a system includes logic adapted for receiving a first request to change a state of a first group of catalogs, determining which of a plurality of catalogs belong in the first group, adding a change request for each of the first group of catalogs to a queue for processing, causing processing of each change request in the queue to change the state of each of the first group of catalogs according to the first request, creating a first group result indicating successful or failed state change upon a catalog in the first group of catalogs finishing processing, passing the first group result to an adjacent catalog in the first group of catalogs, removing each catalog that has finished processing from the first group of catalogs, and outputting the group result when there are no adjacent catalogs available to pass the group result.

20 Claims, 4 Drawing Sheets

(56) References Cited

U.S. PATENT DOCUMENTS

| | | | |
|---|---|---|---|
| 2008/0263106 A1* | 10/2008 | Asherman et al. | 707/202 |
| 2009/0210429 A1* | 8/2009 | Agrawal et al. | 707/10 |
| 2010/0049937 A1* | 2/2010 | Chauvet | G06F 3/0611 711/170 |
| 2010/0185697 A1* | 7/2010 | Lehr et al. | 707/803 |
| 2010/0191738 A1* | 7/2010 | Lehr et al. | 707/741 |

OTHER PUBLICATIONS

Tate et al., "Enhanced Catalog Sharing and Management," IBM, International Technical Support Organization, www.redbooks.ibm.com, SG24-5594-00, Jul. 1999, pp. 1-148.

Jiminez et al., "ICF Catalog Backup and Recovery: A Practical Guide," IBM, International Technical Support Organization, ibm.com/redbooks, SG24-5644-01, Dec. 2001, pp. 1-190.

* cited by examiner

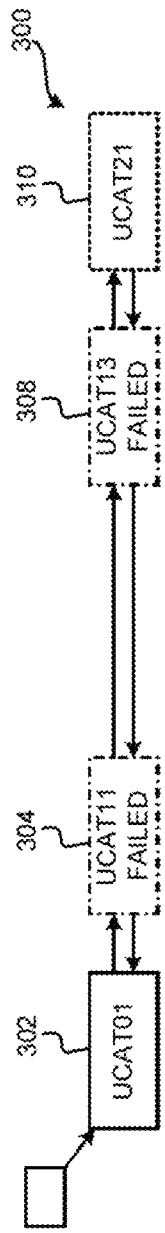
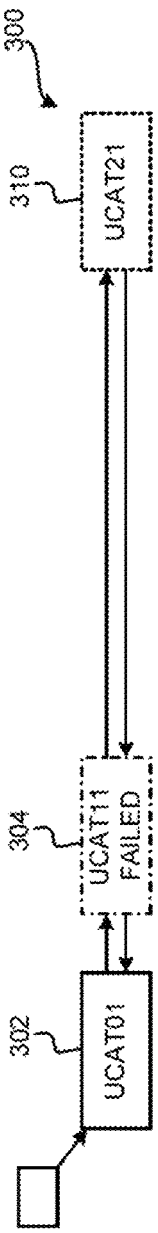
FIG. 3A
FIG. 3B
FIG. 3C
FIG. 3D

ASYNCHRONOUS SERIALIZATION FOR AGGREGATING PROCESS RESULTS

BACKGROUND

The present invention relates to network switches and switching, and more particularly, this invention relates to aggregating process results using asynchronous serialization.

In mainframe operating systems, there is typically a vast amount of data that is available, and therefore it is important to minimize the amount of time that is used to search through this data for particular data sets or files. Particularly, in IBM z/OS, it is possible to change the state of catalogs (indexes) in order to modify some aspect of the catalog. At the end of the modify command, the system needs to aggregate all results of the state change from each user catalog and display a message summarizing whether the command has executed successfully. However, each modify command inserts a group of elements into a double-linked list, with each element representing a request to change a catalog's state. One problem with this process is how to effectively process these elements, summarize the results, and determine whether the last element in the group has been executed for the message to display.

SUMMARY

In one embodiment, a system includes logic adapted for receiving a first request to change a state of a first group of catalogs, logic adapted for determining which of a plurality of catalogs belong in the first group, logic adapted for adding a change request for each of the first group of catalogs to a queue for processing, logic adapted for causing processing of each change request in the queue to change the state of each of the first group of catalogs according to the first request, logic adapted for creating a first group result indicating successful or failed state change upon a catalog in the first group of catalogs finishing processing, logic adapted for passing the first group result to an adjacent catalog in the first group of catalogs, logic adapted for removing each catalog that has finished processing from the first group of catalogs, and logic adapted for outputting the group result when there are no adjacent catalogs available to pass the group result.

In another embodiment, a computer program product including a computer readable storage medium having computer readable program code embodied therewith, the computer readable program code including computer readable program code configured for receiving a first request to change a state of a first group of catalogs, computer readable program code configured for determining which of a plurality of catalogs belong in the first group, computer readable program code configured for adding a change request for each of the first group of catalogs to a queue for processing, computer readable program code configured for causing processing of each change request in the queue to change the state of each of the first group of catalogs according to the first request, computer readable program code configured for creating a first group result indicating successful or failed state change upon a catalog in the first group of catalogs finishing processing, computer readable program code configured for passing the first group result to an adjacent catalog in the first group of catalogs, computer readable program code configured for removing each catalog that has finished processing from the first group of catalogs, and computer readable program code configured for outputting the group result when there are no adjacent catalogs available to pass the group result.

In yet another embodiment, a method includes receiving a first request to change a state of a first group of catalogs, determining which of a plurality of catalogs belong in the first group, adding a change request for each of the first group of catalogs to a queue for processing, causing processing of each change request in the queue to change the state of each of the first group of catalogs according to the first request, creating a first group result indicating successful or failed state change upon a catalog in the first group of catalogs finishing processing, passing the first group result to an adjacent catalog in the first group of catalogs, removing each catalog that has finished processing from the first group of catalogs, and outputting the group result when there are no adjacent catalogs available to pass the group result.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 3A-3D are simplified diagrams illustrating stages of state changes for a group of catalogs, according to one embodiment.

DETAILED DESCRIPTION

Figure 1:
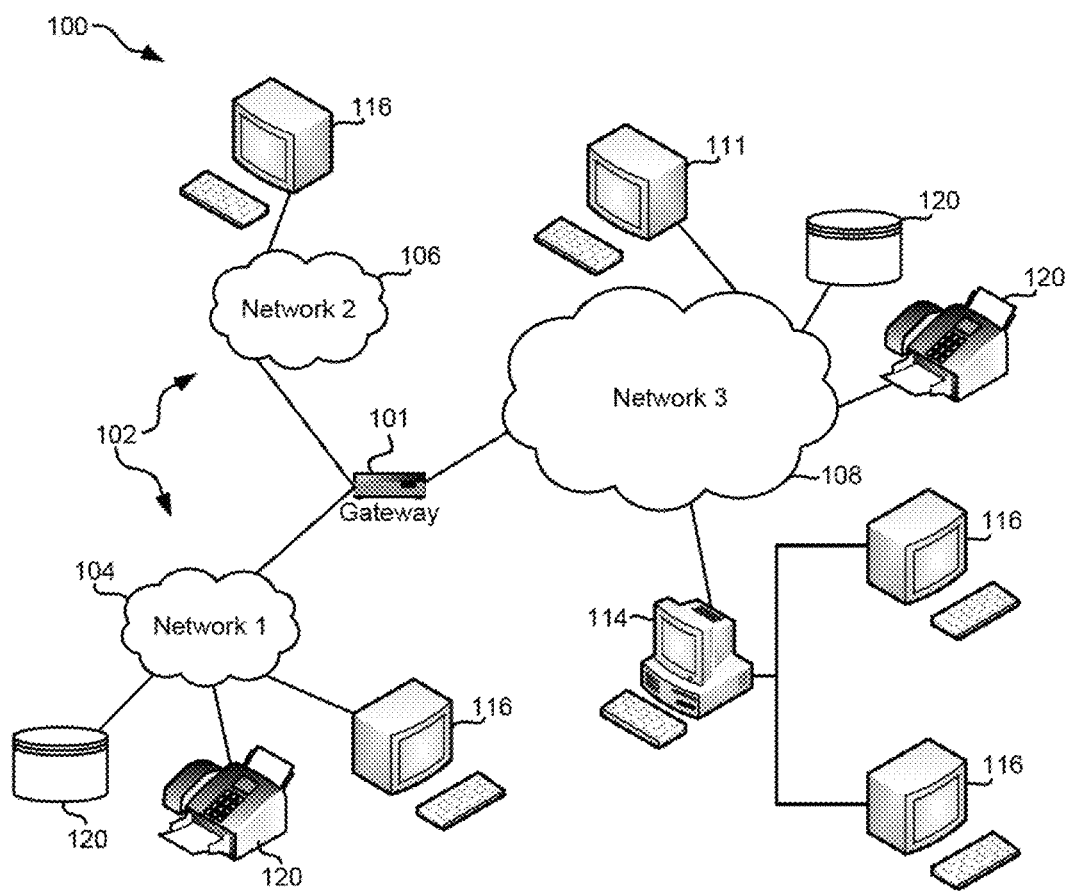
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to some embodiments, when changes are to be made to a group of catalogs, such as in IBM z/OS, it is possible to identify if the changes are successful or not without needing to keep track of each operation individually. Instead, an identifier is passed from one finished catalog to the next until all catalogs have finished or failed, and then this identifier indicates this effect. Therefore, these changes to catalog states may be effectively processed, the results summarized, and it may be determined if all processing has completed.

In one general embodiment, a system includes logic adapted for receiving a first request to change a state of a first group of catalogs, logic adapted for determining which of a plurality of catalogs belong in the first group, logic adapted for adding a change request for each of the first group of catalogs to a queue for processing, logic adapted for causing processing of each change request in the queue to change the state of each of the first group of catalogs according to the first request, logic adapted for creating a first group result indicating successful or failed state change upon a catalog in the first group of catalogs finishing processing, logic adapted for passing the first group result to an adjacent catalog in the first group of catalogs, logic adapted for removing each catalog that has finished processing from the first group of catalogs, and logic adapted for outputting the group result when there are no adjacent catalogs available to pass the group result.

In another general embodiment, a computer program product including a computer readable storage medium having computer readable program code embodied therewith, the computer readable program code including computer readable program code configured for receiving a first request to change a state of a first group of catalogs, computer readable program code configured for determining which of a plurality of catalogs belong in the first group, computer readable program code configured for adding a change request for each of the first group of catalogs to a queue for processing, computer readable program code configured for causing processing of each change request in the queue to change the state of each of the first group of catalogs according to the first request, computer readable program code configured for creating a first group result indicating successful or failed state change upon a catalog in the first group of catalogs finishing processing, computer readable program code configured for passing the first group result to an adjacent catalog in the first group of catalogs, computer readable program code configured for removing each catalog that has finished processing from the first group of catalogs, and computer readable program code configured for outputting the group result when there are no adjacent catalogs available to pass the group result.

In yet another general embodiment, a method includes receiving a first request to change a state of a first group of catalogs, determining which of a plurality of catalogs belong in the first group, adding a change request for each of the first group of catalogs to a queue for processing, causing processing of each change request in the queue to change the state of each of the first group of catalogs according to the first request, creating a first group result indicating successful or failed state change upon a catalog in the first group of catalogs finishing processing, passing the first group result to an adjacent catalog in the first group of catalogs, removing each catalog that has finished processing from the first group of catalogs, and outputting the group result when there are no adjacent catalogs available to pass the group result.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and other procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
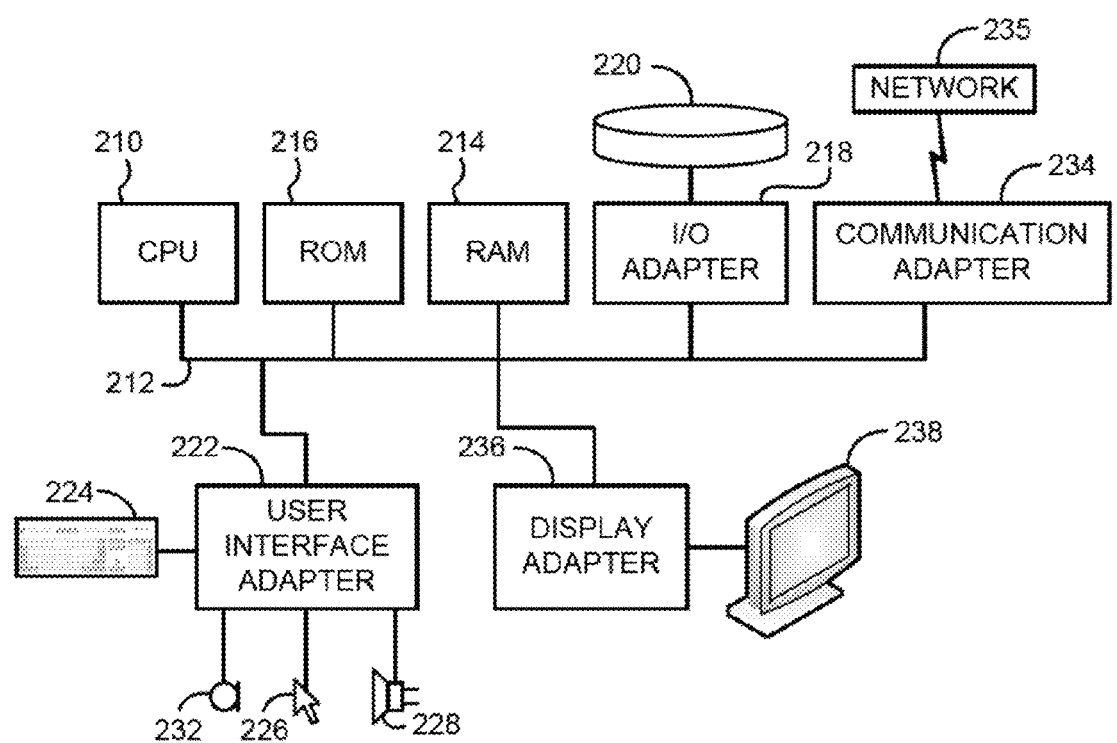
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In mainframe operating systems, indexes may store data relating to locations of files on direct access storage devices (DASD) and/or tape media. Specifically, in IBM z/OS, catalogs comprise information relating to locations of data sets on DASD and/or tape media. A catalog is organized as a data set and includes records that relate to specific data sets stored to media somewhere in the network.

According to embodiments presented herein, six modify commands are available in IBM z/OS to change the state of one or more user catalog ("ucat") by using a wildcard in the catalog name. The format for these modify commands are as follows: F CATALOG,state(ucat*), where state can be any of the following six: RLSQUIESCE; RLSENABLE; RECOVER,LOCK; RECOVER,UNLOCK; RECOVER,SUSPEND; or RECOVER,RESUME. RLSQUIESCE is a command that causes referenced catalogs to be accessed by non-record level sharing (RLS) access methods on the next access request. RLSENABLE is a command that causes referenced catalogs to be accessed with RLS on the next access request. RECOVER,LOCK is a command that locks referenced catalogs, causing all access attempts to the locked catalog to fail. RECOVER,UNLOCK is a command that unlocks referenced catalogs, effectively allowing any access attempts to proceed. RECOVER,SUSPEND is a command that suspends access attempts for referenced catalogs and possibly stores them to a queue, but does not fail the access attempts. RECOVER,RESUME is a command that resumes access attempts for referenced catalogs, possibly starting with those stored to the queue.

F CATALOG,state(ucat*) changes the state of all user catalogs that match the specified wildcard name. For example, F CATALOG,LOCK(ucat1*) will lock catalogs ucat11, ucat12, ucat13, etc. Similarly, F CATALOG,LOCK (ucat2*) will lock ucat21, ucat22, ucat23, etc.

At the end of each modify command, the system aggregates all results of the state change from each user catalog and displays a message summarizing whether the command executed successfully. However, as stated earlier, each modify command inserts a group of elements into a double-linked list, with each element representing a request to change a catalog's state. Accordingly, using some techniques, it is difficult to effectively process these elements, summarize the results, and determine whether the last element in the group has been executed to trigger the message to be displayed.

One illustrative method comprises having one task process each element one-by-one in the order it is inserted. In one example, if ucat11 and ucat12 are issued, then ucat11 is processed first, and when processing is complete, ucat12 is processed. For any further modify commands, the processing occurs in series, with any serialization being waited for synchronously. The group result of the modify command is recorded and updated somewhere within the task's autodata area each time an element is done processing. When the next element does not belong to the group, the result aggregation is stopped and the group result is displayed. However, if the task is stuck processing ucat11 and is waiting for a serialization, ucat12 will never be completed, which is a major drawback to this method. Also, any modify commands subsequent to the command on which the task is stuck, in this example ucat11, will also need to wait, slowing the efficiency of the method.

In another illustrative method, the method executes similarly to the above example except that the single processing task waits asynchronously for any serialization. This means that if a task does not obtain a serialization right away, it puts this element on hold and continues on to process the next element(s). When the serialization is granted, the task then gets driven again to process the element. The group result is recorded and updated somewhere within the task's autodata area each time an element is done processing. The linked list is traversed throughout to determine if it is the last element, and if it is, the result is displayed, otherwise, the next element is aggregated. However, traversing the linked list throughout each time an element is done processing is very costly, in time and processing power terms. Also, the results kept in the task's autodata area need to be structured because multiple groups may be in the linked list, which is also processing intensive.

In another illustrative method, the method executes similarly to the two above examples, with an additional step of recording the number of elements in the group as a counter somewhere in the task's autodata area. Them, after processing of each element is complete, the counter is decremented by one. When the counter is decremented down to one, the group result is displayed. However, the task's autodata area still needs to have some kind of structures to track all the values used in the processing, just as in the second example but now also including the counter.

In one embodiment, a method of asynchronous serialization for aggregating process results is provided which overcomes the drawbacks of the several illustrative methods described briefly above. The method records the group result in each element and passes it on to an adjacent element (either a previous element or a next element) that is within the group and is to be processed next. When none of the adjacent elements is within the group, this indicates to the processing element that the element being processed is the last element in the group. At this point, the group result is displayed. This technique eliminates the need to keep track of the group result and element numbers in the task's autodata area when the task does not wait synchronously for any serializations.

In one such embodiment, a record stored in virtual storage access method (VSAM) volume data set (VVDS) to the DASD, referred to herein as a catalog VSAM volume record (VVR), may be used to indicate a state of any catalog (e.g., RLSENABLE; RECOVER,SUSPEND; etc.) stored to the DASD or elsewhere. The VVR is a type of placeholder that describes everything about a particular catalog and is stored to the DASD in case all the systems are wiped out or erased, then the information about the catalogs may be retrieved from the DASD. Accordingly, whenever a catalog is open, the status bit in the VVR may be read, and if the VVR indicates that the catalog is RLSQUIESCE or RLSENABLE then the system needs to process and understand this status such that the catalog is opened in the same way that all of the other systems are opening the catalog.

According to one embodiment, referring now to FIGS. 3A-3D, an example is provided to illustrate the method of storing a group result from a wildcard request for a status change in a group of catalogs. Referring to FIG. 3A, assume that the following three commands are issued in the following order:
1. F CATALOG,state(UCAT0*)
2. F CATALOG,state(UCAT1*)
3. F CATALOG,state(UCAT2*)

where state indicates one of many possible modify commands, such as those described herein (e.g., RLSQUIESCE, RECOVER,SUSPEND, etc.) or others.

Continuing with the example, assume that the modify command F CATALOG,state(UCAT0*) adds UCAT01 302 into a queue 300 or chain of commands to process. Then, following UCAT01 302, F CATALOG,state(UCAT1*) adds UCAT11 304, UCAT12 306, and UCAT13 308 into the queue 300. Once those commands are serialized to process in the queue 300, F CATALOG,state(UCAT2*) adds UCAT21 310 into the queue 300.

Continuing with the example, referring now to FIG. 3B, assume that UCAT01 302 and UCAT21 310 are both taking more time to finish processing than the other catalogs. For example, UCAT12 306 finishes processing first, but fails to change its state. UCAT12 306 updates its own 'group result' to FAILED to indicate this failed state change. UCAT12 306 also propagates the group result of FAILED to one adjacent element, UCAT13 308 or UCAT11 304. In this example, assume that the group result (FAILED) is propagated to UCAT13 308 even though UCAT13 308 is not done processing yet.

Then, for the sake of this example, referring now to FIG. 3C, assume that UCAT13 308 finishes processing successfully. However, since the group result of UCAT13 308 indicates FAILED by virtue of the propagation of the FAILED group result from UCAT12 306, UCAT13 308 propagates the group result of FAILED to the only adjacent element in the group, UCAT11 304, even though UCAT11 304 is not done processing yet.

Referring now to FIG. 3D, when UCAT11 304 finishes processing successfully, it checks its adjacent elements (UCAT21 310 and UCAT01 302) and finds that none of them belongs to the same group (UCAT1*). Accordingly, UCAT11 304 determines that it is the last element in the group to finish processing, and therefore the group result is output, which in the example is FAILED.

This method may be used not only to keep track of the group state (FAILED or SUCCESS), but also a numerical result, in one embodiment. For example, if the request is to count how many data sets these particular catalogs store location information for, the count may be passed to an adjacent element as it finishes processing just like the group result state is passed along. The final element to finish processing will then output the count. Similarly, a numerical count may be kept of how many datasets are affected by the catalog state changes, or some other numerical values.

In more embodiments, other types of information may be passed from element to element in the group until all elements are processed, as would be known by one of skill in the art.

Figure 4:
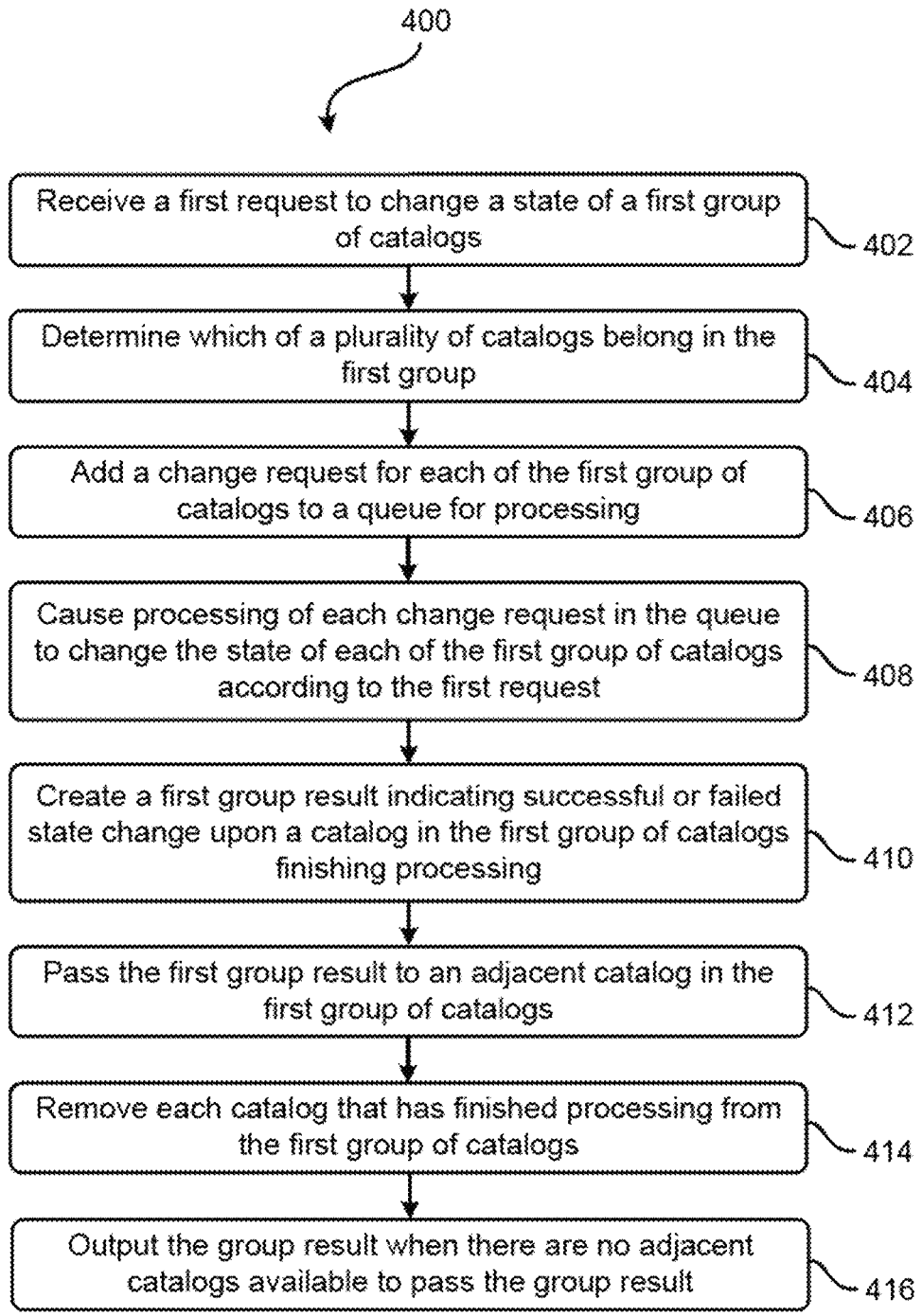
FIG. 4 shows a flowchart of a method, according to one embodiment.

Now referring to FIG. 4, a flowchart of a method 400 is shown, according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in one embodiment, the method 400 may be partially or entirely performed by a processor, in one approach, such as a central processing unit (CPU), application specific integrated circuit (ASIC), field programmable gate array (FPGA), etc.

In addition, the commands may be issued from one system (or image) in a sysplex (comprising multiple systems), and may result in sysplex wide enable or quiesce of the specified catalogs, e.g., all user catalogs (ucat*). In one approach to avoid contentions and damage to catalogs, catalog requests may be suspended when enabling/quiescing RLS access. Furthermore, no catalog requests fail as a result of the enable or quiesce, according to the embodiment described herein.

Optional operations described below are those operations which may be omitted, or may be performed once while other operations are performed multiple times, or may be performed by other entities are systems and relied upon by other operations, according to various embodiments.

As shown in FIG. 4, method 400 may initiate with operation 402, where a first request to change a state of a first group of catalogs is received.

In operation 404, which of a plurality of catalogs belong in the first group is determined.

In operation 406, a change request for each of the first group of catalogs is added to a queue for processing.

In operation 408, processing of each change request in the queue is caused in order to change the state of each of the first group of catalogs according to the first request.

In operation 410, upon a catalog in the first group of catalogs finishing processing, a first group result is created indicating successful or failed state change.

In operation 412, the fast group result is passed to an adjacent catalog in the first group of catalogs.

In operation 414, each catalog that has finished processing is received from the first group of catalogs.

In operation 416, the group result is outputted when there are no adjacent catalogs available to pass the group result. In this way, after all catalogs have been processed in the first group, the group result is output.

Outputting may include, but is not limited to, displaying, reporting, sounding, storing to media, or any other method of outputting as is known in the art.

In one embodiment, a failed state change of any catalog in the first group of catalogs may cause the first group result to indicate a failed state change. In this way, if one catalog does not change states as requested, then the whole group is reported as having failed the state change.

In another embodiment, a successful state change from all catalogs in the first group of catalogs may be required in order for the first group result to indicate a successful state change. This is similar to the embodiment, except that the status of successful is determined, instead of the status of failed.

According to a further embodiment, the method 400 may also include sending a message to each system having access to the first group of catalogs to close the first group of catalogs and receiving acknowledgement that all of the first group of catalogs is closed prior to causing processing of each change request in the queue to change the state of each of the first group of catalogs. In this way, it may be ensured that there will be no conflicts when changing the state of a catalog due to the catalog being open on another system.

In yet another further embodiment, a second request may be received to process additional catalog state changes. For example, the method 400 may also include receiving a second request to change a state of a second group of catalogs, determining which of the plurality of catalogs belong in the second group, adding a change request for each of the second group of catalogs to the queue for processing, causing processing of each change request in the queue to change the state of each of the second group of catalogs according to the second request, creating a second group result indicating successful or failed state change upon a catalog in the second group of catalogs finishing processing, passing the second group result to an adjacent catalog in the second group of catalogs, removing each catalog that has finished processing from the second group of catalogs, and outputting the second group result when there are no adjacent catalogs available to pass the second group result.

In another approach, the method 400 may further comprise passing a numerical counter with the first group result to the adjacent catalog in the first group of catalogs and outputting the numerical counter with the first group result. In a further approach, the numerical counter may correspond to a total number of records in each processed catalog, or any other numerical value associated with catalogs and/or changing states of catalogs.

In more embodiments, the method 400 or methods similar to method 400 may be executed in a computer program product using computer readable program code.

In even more embodiments, the method 400 or methods similar to method 400 may be executed by a system using logic adapted for carrying out the operations of method 400.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a hardware processor configured to execute logic;
logic configured to receive a first request to change a state of a first group of catalogs, the first group of catalogs numbering three or more catalogs;
logic configured to determine which of a plurality of catalogs belong in the first group by referring to a catalog virtual storage access method (VSAM) volume record (VVR) stored in a VSAM volume data set (VVDS) on a direct access storage device (DASD), each catalog in the first group of catalogs being a same type of catalog, wherein the VVR stores an individual state of each catalog in the first group of catalogs;

logic configured to add a change request for each catalog of the first group of catalogs to a queue for processing;

logic configured to cause processing of each change request in the queue to change the state of each catalog in the first group of catalogs to cause a state change of each catalog in the first group of catalogs according to the first request, wherein the state change is successful when the state of a catalog being processed in the first group of catalogs is changed as requested in the first request, and wherein the state change is failed when the state of the catalog being processed in the first group of catalogs does not change as requested in the first request;

logic configured to create a first group result indicating successful or failed state change upon a first catalog in the first group of catalogs finishing processing;

logic configured to update the first group result indicating successful or failed state change and pass the first group result to an adjacent catalog in the first group of catalogs upon each catalog in the first group of catalogs finishing processing;

logic configured to pass a numerical counter with the first group result to the adjacent catalog in the first group of catalogs upon each catalog in the first group of catalogs finishing processing, the numerical counter tracking: a total number of datasets affected by catalog state changes, or a total number of records in all processed catalogs;

logic configured to remove each catalog that has finished processing from the first group of catalogs after it has updated the first group result;

logic configured to update the VVR to reflect the individual state of each catalog in the first group of catalogs after processing of each catalog in the first group of catalogs is complete; and logic configured to display the group result when there are no adjacent catalogs available to pass the group result.

2. The system as recited in claim 1, further comprising:

logic configured to send a message to each system having access to the first group of catalogs to close the first group of catalogs;

logic configured to receive acknowledgement that all of the first group of catalogs is closed prior to causing processing of each change request in the queue to change the state of each of the first group of catalogs; and logic configured to display the numerical counter with the first group result, wherein the adjacent catalog in the first group of catalogs is a user catalog that stores information relating to locations of data sets, wherein a failed state change of any catalog in the first group of catalogs causes the first group result to indicate a failed state change, and wherein a successful state change from all catalogs in the first group of catalogs is required in order for the first group result to indicate a successful state change, and wherein each catalog in the first group of catalogs stores data location information, and wherein the state of each of the first group of catalogs is selected from a group consisting of: RLSQUIESCE: RLSENABLE: RECOVER,LOCK: RECOVER,UNLOCK: RECOVER, SUSPEND, or RECOVER,RESUME.

3. The system as recited in claim 2, wherein the logic configured to cause processing of each change request in the queue is further configured to open any catalog having a state of RLSQUIESCE or RLSENABLE in a manner consistent with how any other systems have opened the catalog.

4. The system as recited in claim 1, further comprising:

logic configured to receive a second request to change a state of a second group of catalogs;

logic configured to determine which of the plurality of catalogs belong in the second group;

logic configured to add a change request for each of the second group of catalogs to the queue for processing;

logic configured to cause processing of each change request in the queue to change the state of each of the second group of catalogs according to the second request;

logic configured to create a second group result indicating successful or failed state change upon a catalog in the second group of catalogs finishing processing;

logic configured to pass the second group result to an adjacent catalog in the second group of catalogs;

logic configured to remove each catalog that has finished processing from the second group of catalogs; and logic configured to display the second group result when there are no adjacent catalogs available to pass the second group result.

5. The system as recited in claim 1, further comprising:

logic configured to display the numerical counter with the first group result.

6. The system as recited in claim 5, wherein the first group result is not tracked or stored to an autodata area, and wherein the numerical counter is not tracked or stored to the autodata area.

7. The system as recited in claim 5, wherein a failed state change of any catalog in the first group of catalogs causes the first group result to indicate a failed state change, and wherein a successful state change from all catalogs in the first group of catalogs is required in order for the first group result to indicate a successful state change, and wherein each catalog in the first group of catalogs stores data location information.

8. A computer program product, the computer program product comprising a non-transitory computer readable storage medium having computer readable program code embodied therewith, the computer readable program code comprising:

computer readable program code configured for receiving a first request to change a state of a first group of catalogs, the first group of catalogs numbering three or more catalogs;

computer readable program code configured for determining which of a plurality of catalogs belong in the first group of catalogs by referring to a catalog virtual storage access method (VSAM) volume record (VVR) stored in a VSAM volume data set (VVDS) on a direct access storage device (DASD), wherein the VVR stores an individual state of each catalog in the first group of catalogs;

computer readable program code configured for adding a change request for each catalog of the first group of catalogs to a queue for processing;

computer readable program code configured for causing processing of each change request in the queue to change the state of each catalog in the first group of catalogs to cause a state change of each catalog in the first group of catalogs according to the first request, wherein the state change is successful when the state of a catalog being processed in the first group of catalogs is changed as requested in the first request, and wherein the state change is failed when the state of the catalog being processed in the first group of catalogs does not change as requested in the first request;

computer readable program code configured for creating a first group result indicating successful or failed state change upon a catalog in the first group of catalogs finishing processing;

computer readable program code configured for passing the first group result to an adjacent catalog in the first group of catalogs;

computer readable program code configured for passing a numerical counter with the first group result to the adjacent catalog in the first group of catalogs upon each catalog in the first group of catalogs finishing processing, the numerical counter tracking: a total number of datasets affected by catalog state changes, or a total number of records in all processed catalogs;

computer readable program code configured for removing each catalog that has finished processing from the first group of catalogs;

computer readable program code configured for updating the VVR to reflect the individual state of each catalog in the first group of catalogs after processing of each catalog in the first group of catalogs is complete; and computer readable program code configured for displaying the group result when there are no adjacent catalogs available to pass the group result.

9. The computer program product as recited in claim 8, wherein a failed state change of any catalog in the first group of catalogs causes the first group result to indicate a failed state change, and wherein the adjacent catalog in the first group of catalogs is a user catalog that stores information relating to locations of data sets.

10. The computer program product as recited in claim 9, further comprising: computer readable program code configured for displaying the numerical counter with the first group result.

11. The computer program product as recited in claim 10, wherein the computer readable program code configured for causing processing of each change request in the queue is further configured for opening any catalog having a state of RLSQUIESCE or RLSENABLE in a manner consistent with how any other systems have opened the catalog, and wherein each catalog in the first group of catalogs is a same type of catalog.

12. The computer program product as recited in claim 8, wherein a successful state change from all catalogs in the first group of catalogs is required in order for the first group result to indicate a successful state change.

13. The computer program product as recited in claim 8, further comprising:

computer readable program code configured for sending a message to each system having access to the first group of catalogs to close the first group of catalogs;

computer readable program code configured for receiving acknowledgement that all of the first group of catalogs is closed prior to causing processing of each change request in the queue to change the state of each of the first group of catalogs; and computer readable program code configured for displaying the numerical counter with the first group result, wherein the adjacent catalog in the first group of catalogs is a user catalog that stores information relating to locations of data sets, wherein a failed state change of any catalog in the first group of catalogs causes the first group result to indicate a failed state change, and wherein a successful state change from all catalogs in the first group of catalogs is required in order for the first group result to indicate a successful state change, and wherein each catalog in the first group of catalogs stores data location information, and wherein the state of each of the first group of catalogs is selected from a group consisting of: RLSQUIESCE: RLSENABLE: RECOVER,LOCK: RECOVER,UNLOCK: RECOVER, SUSPEND, or RECOVER,RESUME.

14. The computer program product as recited in claim 8, further comprising:

computer readable program code configured for receiving a second request to change a state of a second group of catalogs;

computer readable program code configured for determining which of the plurality of catalogs belong in the second group;

computer readable program code configured for adding a change request for each of the second group of catalogs to the queue for processing;

computer readable program code configured for causing processing of each change request in the queue to change the state of each of the second group of catalogs according to the second request;

computer readable program code configured for creating a second group result indicating successful or failed state change upon a catalog in the second group of catalogs finishing processing;

computer readable program code configured for passing the second group result to an adjacent catalog in the second group of catalogs;

computer readable program code configured for removing each catalog that has finished processing from the second group of catalogs; and computer readable program code configured for displaying the second group result when there are no adjacent catalogs available to pass the second group result.

15. A method, comprising:

receiving a first request to change a state of a first group of catalogs;

determining which of a plurality of catalogs belong in the first group of catalogs by referring to a catalog virtual storage access method (VSAM) volume record (VVR) stored in a VSAM volume data set (VVDS) on a direct access storage device (DASD), the first group of catalogs numbering three or more catalogs, wherein the VVR stores an individual state of each catalog in the first group of catalogs;

adding a change request for each catalog of the first group of catalogs to a queue for processing;

causing processing of each change request in the queue to change the state of each catalog in the first group of catalogs to cause a state change of each catalog in the first group of catalogs according to the first request, wherein the state change is successful when the state of a catalog being processed in the first group of catalogs is changed as requested in the first request, and wherein the state change is failed when the state of the catalog being processed in the first group of catalogs does not change as requested in the first request;

upon a catalog in the first group of catalogs finishing processing, creating a first group result indicating successful or failed state change;

passing the first group result to an adjacent catalog in the first group of catalogs;

passing a numerical counter with the first group result to the adjacent catalog in the first group of catalogs upon each catalog in the first group of catalogs finishing processing, the numerical counter tracking: a total number of datasets affected by catalog state changes, or a total number of records in all processed catalogs;

removing each catalog that has finished processing from the first group of catalogs;

updating the VVR to reflect the individual state of each catalog in the first group of catalogs after processing of each catalog in the first group of catalogs is complete; and displaying the group result when there are no adjacent catalogs available to pass the group result.

16. The method as recited in claim 15, wherein a failed state change of any catalog in the first group of catalogs causes the first group result to indicate a failed state change, and wherein the adjacent catalog in the first group of catalogs is a user catalog that stores information relating to locations of data sets.

17. The method as recited in claim 15, wherein a successful state change from all catalogs in the first group of catalogs is required in order for the first group result to indicate a successful state change.

18. The method as recited in claim 15, further comprising:
sending a message to each system having access to the first group of catalogs to close the first group of catalogs;

receiving acknowledgement that all of the first group of catalogs is closed prior to causing processing of each change request in the queue to change the state of each of the first group of catalogs; and displaying the numerical counter with the first group result, wherein the adjacent catalog in the first group of catalogs is a user catalog that stores information relating to locations of data sets, wherein a failed state change of any catalog in the first group of catalogs causes the first group result to indicate a failed state change, and wherein a successful state change from all catalogs in the first group of catalogs is required in order for the first group result to indicate a successful state change, and wherein each catalog in the first group of catalogs stores data location information, and wherein the state of each of the first group of catalogs is selected from a group consisting of: RLSQUIESCE: RLSENABLE: RECOVER,LOCK: RECOVER,UNLOCK: RECOVER, SUSPEND, or RECOVER,RESUME.

19. The method as recited in claim 15, further comprising: receiving a second request to change a state of a second group of catalogs; determining which of the plurality of catalogs belong in the second group; adding a change request for each of the second group of catalogs to the queue for processing; causing processing of each change request in the queue to change the state of each of the second group of catalogs according to the second request; upon a catalog in the second group of catalogs finishing processing, creating a second group result indicating successful or failed state change; passing the second group result to an adjacent catalog in the second group of catalogs; removing each catalog that has finished processing from the second group of catalogs; and displaying the second group result when there are no adjacent catalogs available to pass the second group result.

20. The method as recited in claim 16, further comprising: displaying the numerical counter with the first group result, wherein the causing processing of each change request in the queue further comprises opening any catalog having a state of RLSQUIESCE or RLSENABLE in a manner consistent with how any other systems have opened the catalog, and wherein each catalog in the first group of catalogs is a same type of catalog.

* * * * *